United States Patent [19]
Burnham

[11] 3,854,980
[45] Dec. 17, 1974

[54] SOLID DIELECTRIC CAPACITORS AND METHOD

[75] Inventor: John Burnham, Los Angeles, Calif.

[73] Assignee: Hughes Aircraft Company, Culver City, Calif.

[22] Filed: Dec. 17, 1973

[21] Appl. No.: 425,393

Related U.S. Application Data

[63] Continuation-in-part of Ser. No. 252,121, May 10, 1972, abandoned.

[52] U.S. Cl................ 117/61, 117/61, 117/65.2, 117/155 R, 117/161 P, 117/161 UH, 117/161 ZB, 317/260 V, 317/261

[51] Int. Cl................. B44d 1/36, B32b 27/38

[58] Field of Search........ 117/61, 65.2, 232, 161 P, 117/161 UH, 161 ZB, 155 R; 317/260 V, 261

[56] References Cited
UNITED STATES PATENTS

| | | | |
|---|---|---|---|
| 2,912,382 | 11/1959 | Liao et al............................. | 117/61 |
| 3,026,457 | 3/1962 | Ruscito............................. | 317/260 |
| 3,085,183 | 4/1963 | Dokuchitz et al................. | 317/260 |
| 3,531,321 | 9/1970 | Batzer et al........................ | 117/232 |
| 3,536,657 | 10/1970 | Noshay et al...................... | 117/232 |
| 3,695,929 | 10/1972 | Sattler............................... | 117/232 |
| 3,733,308 | 5/1973 | Bach................................. | 117/232 |

*Primary Examiner*—William R. Trenor
*Attorney, Agent, or Firm*—W. H. MacAllister; J. A. Sarjeant

[57] ABSTRACT

High voltage capacitors capable of resisting corona inception at far greater voltage levels than state of the art capacitors have been developed. This advance is attributable to a production method which results in a significant reduction in the void content of the finished capacitor. The essence of this invention consists of a method of providing an excess of resin during the curing process which acts to replenish the volume of resin diminished during cure due to resin shrinkage. Dielectric resins, known to the art, may be used which have a shrinkage value on the order of 2 percent or less during polymerization.

4 Claims, 1 Drawing Figure

PATENTED DEC 17 1974	3,854,980
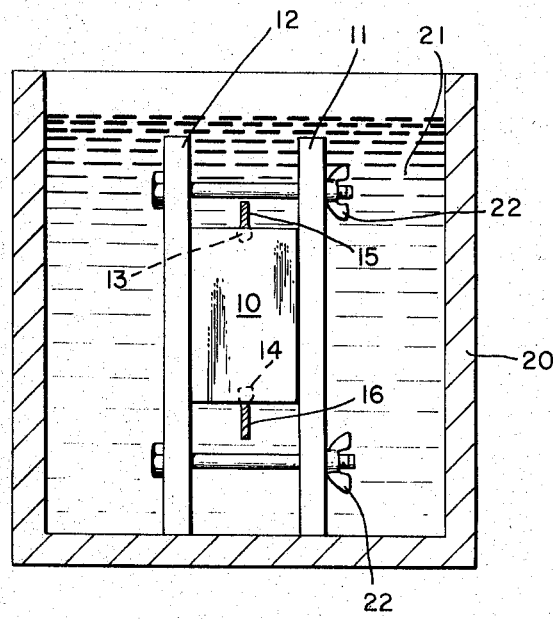

SOLID DIELECTRIC CAPACITORS AND METHOD

RELATED APPLICATIONS

This application is a continuation-in-part of application Ser. No. 252,121, filed May 10, 1972, and now abandoned.

BACKGROUND OF THE INVENTION

1. Field of the Invention

The invention relates to methods of producing high voltage solid state capacitors useful for high performance radar applications.

2. Description of the Prior Art

Resin impregnated capacitors are known in the art. However, capacitors known to the art show corona inception at or about 900 volts (125 v/mil) which appears to be due to voids in the solid dielectric impregnant which is usually introduced into the capacitor section as a liquid and polymerized in situ. These voids are apparently a result of the shrinking of the resin in the normal manufacturing process wherein the liquid resin is converted to a polymer in the solid state.

The known and commercially available capacitors are subjected to AC ripple and ringing as well as oscillatory voltages during crowbarring and faults, and fail to meet the critical requirements of reliable high voltage capacity. In the past, the only method available for improving the corona inception voltage of solid dielectric capacitors has been to put sections in series. When high voltages are involved, this increased the weight and size of the capacitor arrangement nullifying the advantages of the solid dielectric. The AC voltages imposed on the present art capacitors results in corona inception of about 900 volts and subsequent degradation which shortens the life to unacceptable levels. Accordingly, it is important to provide capacitors that have uniformly high reliability of high corona inception on the order of 4,000 volts (560 v/mil) and higher whereby size and weight reductions may be realized via the use of single capacitors.

Attempts to develop suitable high performance capacitors in the past have involved vacuum impregnation in the presence of a gaseous dielectric material (Liao U.S. Pat. No. 2,912,382) and vacuum impregnation followed by compression of the capacitor during cure (Dokuchitz U.S. Pat. No. 3,085,183). However, in both instances, the capacitors were removed from the impregnation container, following impregnation, whereby the excess impregnation resin was allowed to drain off of the capacitors prior to effecting a cure of the resins. The superiority of capacitors produced by this invention over those produced by the cited methods is attributed to the step of causing the resin impregnated capacitor to cure in the presence of excess resin, i.e., I do not allow the excess resin to drain from the capacitor prior to curing. The effectiveness of this difference is evidenced by the fact that the Liao method shows an improvement in the corona inception resistance on the order of 70 percent whereas an improvement of over 350 percent is realized by the application of my invention.

The patent literature contains numerous teachings of low outgassing and low shrinkage polymer systems which exhibit good dielectric properties (F. A. Sattler, U.S. Pat. No. 3,695,928; Bach, U.S. Pat. No. 3,733,308; Noshay, U.S. Pat. No. 3,536,657, et al). Many of these materials have proven to be useful in the fabrication of high voltage capacitors via conventional methods. It is expected that they will yield better products when used in accordance with my invention.

BRIEF SUMMARY OF THE INVENTION

This invention or improvement solves problems presently existing in solid state capacitors by utilizing resins having a shrinkage value of not more than 2 percent, during polymerization, in conjunction with their method of application. This method provides improved high performance corona inception solid dielectric capacitors of low weight, which are capable of handling high voltage for filtering power supplies and supplying pulse energy. It is known that the cause of corona in solid dielectric capacitors is due to voids in the solid dielectric impregnant which is usually a polymeric resin introduced as a liquid and polymerized in situ. These voids are a result of the shrinking of the resin in the process of converting the monomer liquid to a polymer. Shrinking results in voids in conventional manufacturing processes because the capacitor section is impregnated with the polymerizable monomer and subsequently the excess is drained off. Thus, when the contraction sets in during polymerization, the volume of the resin decreases and there is no excess resin available to replace that which is drawn into the section by contraction, and voids result. Voids also may result from using a resin mixture which liberates too much gas. I have discovered that by providing a reservoir of low gas producing polymerizable monomer or polymer material and curing agent and submerging the prefabricated capacitor section in the mixture of low outgassing polymerizable monomer or polymer and curing agent material during polymerization, and under intermittent pressure, the voids are avoided or so greatly reduced that the resulting capacitor, after curing, has a much higher corona inception voltage.

When produced in this manner, the corona inception of a plurality of capacitors was tested immediately after pressing and a value of 5,800 volts was obtained. The capacitors were then allowed to stand at room temperature overnight and subsequently cured an additional 16 hours at 65°C before removal of the pressing plates. The completely polymerized sections withstood from 1,800 to 5,000 volts prior to showing signs of corona inception which represents an increase in corona resistance from 100 to 350 percent.

Once corona inception has been reached, capacitors, prepared by my invention, have demonstrated the ability to withstand the resulting stresses without failures for as much as 15,000 times longer than conventionally prepared capacitors.

DESCRIPTION OF THE DRAWING

The FIGURE is representative of structure used in the method of providing improved capacitors embodied in the present disclosure.

DESCRIPTION OF THE PREFERRED EMBODIMENT

In providing airborne radar high voltage capacitors required for filtering power supplies and supplying pulse (energy), a conventional (prefabricated) micapaper wound capacitor section 10 (see the FIGURE) was dried for 13 hours and 125°C while loosely mounted between two metal plates 11 and 12. Prior to the drying, the tabs 13 and 14 of the capacitor 10 were given films of conventional silicone grease 15 and 16, respectively, and the plates 11 and 12 were initially covered with a conventional mold release compound (not shown).

The prefabricated capacitor 10, while still inserted between the plates 11 and 12, was placed in the container 20 and the latter was placed in a vacuum chamber (not shown). The section 10 was still hot when placed in the vacuum. A vacuum of 15 micron was reached in 5 minutes and maintained at 5 micron to about 15 micron for about 1½ hours. The container 20 was then filled with the liquid impregnant resin 21, consisting of a liquid monomer composition of:

| *"Epon" resin | 100 parts or 400 parts |
| *Hardener | 33 parts or 132 parts |

*Preferably the "Epon" resin is a conventional epichlorohydrin-bis-phenol-A (diglycidal ether) heated to 140°F. and the hardener a conventional coreactive curing agent bis (4-amino, 3-methyl cyclohexyl) methane added and mixed thoroughly.

This mixture is prepared in melt form by degassing with a flow of inert gas as nitrogen through the mixture, while heated to a temperature on the order of 180°F. The degassed hot mixture is injected into the container 20 while maintaining a vacuum of about 25 microns. The degassed liquid monomers and/or polymers and curing agent (or partially polymerized polymers and curing agent) combination were injected in a period of about 10 minutes and the container 20 was maintained under a vacuum of 25 to 18 microns for 25 minutes. Atmospheric pressure was then introduced into the vacuum chamber with the capacitor section 10 completely immersed in the resin forming liquid. The container 20 was then heated for 10 minutes at 140°F and put back into the vacuum and a vacuum of about 25 to 18 microns applied for 15 minutes. After introduction of atmospheric pressure, the container 20 was transferred to a pressure pot and 90 to 1,000 PSIG of inert gas, as nitrogen, was applied for 45 minutes. Upon release of this pressure, the section 10 was then pressed by turning down the wing nuts 22, tightening the plates 11 and 12, while the section 10 remained submerged in the resin forming mixture. Other polymers may be used when properly degassed.

The corona inception of the capacitor was measured immediately after pressing and a value of 5,800 volts was obtained. This measurement was made at room temperature.

The section was then allowed to stand overnight during which time it partially polymerized. Polymerization was continued at 65°C for about 16 hours. The section was then taken out of the plates and measured for corona. This section, and other like prepared sections, measured 1,800 to 5,000 volts before showing signs of corona inception.

ILLUSTRATIVE MODIFICATION OF IMPREGNATE OF LOW SHRINKAGE VALUE

Other low outgassing cycloaliphatic epoxy monomers or prepolymers may be utilized as an impregnant. Examples are combinations of the cyclopentadiene dioxide, vinylcyclohexane dioxide, diepoxy compounds derived from Diels Adler Addition reactions where known cyclic, aromatic and aliphatic curing agents and mixtures are utilized in their respective equivalent proportionate parts.

An impregnate composition of high temperature resistant low shrinkage polyimide polymers may be prepared by providing tetraesters of benzophenone-tetracarboxylic acid (or anhydride) such as the methyl, ethyl, propyl, butyl and like mixed esters reacted with a tetraamine as 3,3'-diaminobenzidine, 2,2',3,3'-tetraaminodiphenyl oxide, or the like, to a viscosity on the order of about 0.05p to not over about 0.07p in liquid melt form, and utilized for the polymer forming liquid in container 20. The copolymerizable mixture is prepared as described in application Ser. No. 159,025, filed July 1, 1971, and now abandoned of assignee herein or of the lower viscosity of 0.04p as described in U.S. Pat. No. 3,632,441 of Norman Bilow, included herein by reference. The heat treatment for providing the solid polyimide polymer impregnated capacitor is increased, as technically recognizable, to a treatment of the submerged section 10 from 200°C to 300°C for a controlled period of from 1 to 4 hours during initial evacuation, impregnation and partial polymerization, and the final cure under physical pressure in obtaining a capacitor having improved corona inception.

Another impregnant composition of low shrinkage aromatic polymers may be utilized in container 10 by preparing a molten composition of polymerizable polyphenylene polymers of polymerized aromatics as biphenyl, terphenyl, triphenyl and other phenylene oligomers and polyphenyls in admixture with monofunctional and acid catalyst or polyfunctional curing agent materials as described in U.S. Pat. Nos. 3,560,428, 3,555,104, 3,578,611 and corresponding fusible mixtures of polyphenylene materials and curing agent materials in the disclosures therein and number of related applications enumerated therein, incorporated by reference.

It will now be recognized by those skilled in the art that the various resinous forming mixtures as embodied and described herein of copolymerizable monomer or polymer and curing agent compositions of low shrinkage, of about 2 percent or less, and producing a minimum of voids on curing with particular differences in relative reaction temperatures, control of viscosity during partial polymerization and relative application of the different pressures during processing may, or necessarily, be varied dependent upon the particular combinations. These modifications are less preferable.

Having described the present embodiments of my discovery in accordance with the Patent Statutes, it will now be apparent that some modifications and variations may be made without departing from the spirit and scope thereof. The specific embodiments described are provided by way of illustration and are illustrative of my discovery, invention or improvements which are to be limited only by the terms of the appended claims.

I claim:

1. A method of producing an improved dielectric high voltage capacitor comprising the steps of:
   a. mounting a prefabricated hot-dry capacitor section between a pair of adjustable pressure plates in a container;
   b. evacuating said container to remove substantially all of the entrapped air;
   c. submerging said capacitor section in a liquid composition of a polymerizable resin having a shrinkage factor of less than 2 percent and a curing agent while under vacuum whereby said section is impregnated with said liquid composition;
d. returning said container to atmospheric pressure and applying an inert gas pressure of the order of 90 to 1,000 psig until resin is completely driven into the section;
e. returning the container to atmospheric pressure and pressing the section while still submerged in the resin to an appropriate capacitance;
f. reapplying an inert gas pressure of from 90 to 1,000 psig and heating the resin to polymerize until hard;
g. reducing pressure slowly to atmospheric pressure; and
h. breaking out excess resin from the section and postcuring at an elevated temperature until the maximum mechanical modulus and strength is developed in the resin.

2. The method of claim 1 wherein the polymerizable resin is glycidal cycloaliphatic epoxy.

3. The method of claim 1 wherein the polymerizable resin is a copolymerized polyphenylene.

4. The method of claim 1 wherein the polymerizable resin is a copolymerizable polyamide ester.

* * * * *